(12) United States Patent
Boerkel

(10) Patent No.: US 6,725,836 B1
(45) Date of Patent: Apr. 27, 2004

(54) METHOD OF OPERATING AN INTERNAL COMBUSTION ENGINE

(75) Inventor: Wolfgang Boerkel, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/048,750

(22) PCT Filed: Jul. 19, 2000

(86) PCT No.: PCT/DE00/02350

§ 371 (c)(1),
(2), (4) Date: Jun. 17, 2002

(87) PCT Pub. No.: WO01/09501

PCT Pub. Date: Feb. 8, 2001

(30) Foreign Application Priority Data

Jul. 31, 1999 (DE) .......................... 199 36 202

(51) Int. Cl.⁷ .................. F02D 41/14; F02D 41/40; F02M 25/08

(52) U.S. Cl. .................. 123/431; 123/295; 123/520; 123/698

(58) Field of Search ................ 123/295, 431, 123/518, 519, 520, 698

(56) References Cited

U.S. PATENT DOCUMENTS

| | | | |
|---|---|---|---|
| 4,955,339 A | | 9/1990 | Sasaki et al. ............... 123/295 |
| 6,116,221 A | * | 9/2000 | Matsumoto et al. ........ 123/520 |
| 6,283,088 B1 | * | 9/2001 | Takagi et al. ............... 123/295 |

FOREIGN PATENT DOCUMENTS

| | | |
|---|---|---|
| DE | 196 17 386 | 7/1997 |
| DE | 197 28 112 | 1/1999 |
| EP | 0 488 254 | 6/1992 |
| EP | 0 893 593 | 1/1999 |
| EP | 0 969 197 | 1/2000 |
| JP | 04 094444 | 3/1992 |
| JP | 05 018295 | 1/1993 |
| JP | 10 018890 | 1/1998 |
| JP | 11 036998 | 2/1999 |
| JP | 11 062731 | 3/1999 |
| JP | 11 132097 | 5/1999 |

* cited by examiner

Primary Examiner—Tony M. Argenbright
(74) Attorney, Agent, or Firm—Kenyon & Kenyon

(57) ABSTRACT

An internal combustion engine for a motor vehicle in particular is described; it is equipped with a combustion chamber into which air is drawable through a throttle valve, into which fuel is injectable directly by a fuel injector and ignited by a spark plug during an intake phase in a first mode of operation or during a compression phase in a second mode of operation. An air-fuel mixture may be supplied to the combustion chamber through a fuel tank vent. The control unit controls and/or regulates the internal combustion engine so that in the second mode of operation, a lean air-fuel mixture is drawn into the combustion chamber through the throttle valve and through the fuel tank vent, and the lean air-fuel mixture is ignited by additional fuel injected into combustion chamber and ignited there.

12 Claims, 1 Drawing Sheet

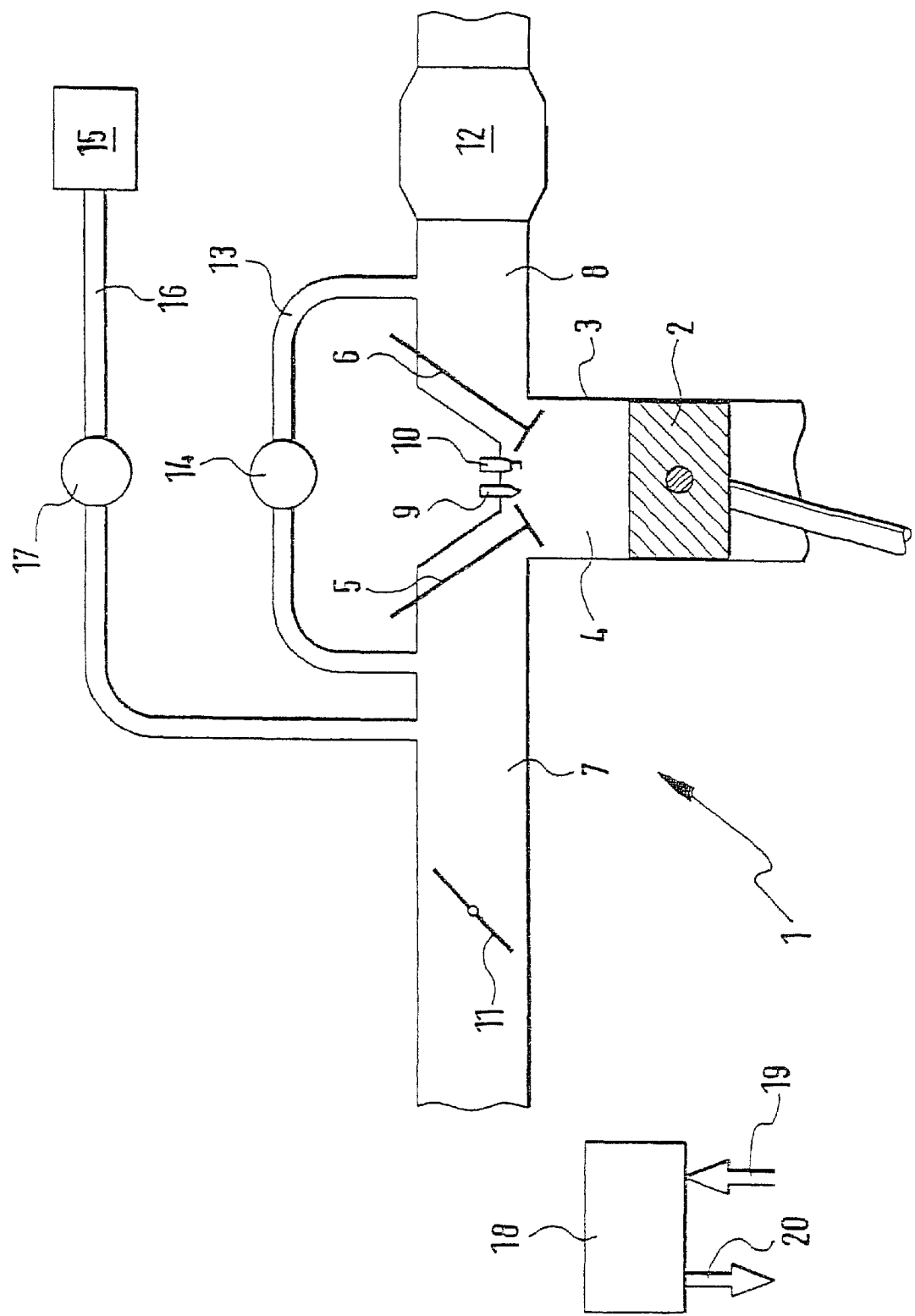

METHOD OF OPERATING AN INTERNAL COMBUSTION ENGINE

FIELD OF THE INVENTION

The present invention relates to a method of operating an internal combustion engine in a motor vehicle in particular where air is drawn in through a throttle device, through a throttle valve, into a combustion chamber in particular, where fuel is injected directly into the combustion chamber during an intake phase in a first mode of operation or during a compression phase in a second mode of operation and ignited there, and a fuel-air mixture is drawn into the combustion chamber through a fuel tank vent. The present invention also relates to a control unit for an internal combustion engine of a motor vehicle in particular and an internal combustion engine for a motor vehicle in particular.

BACKGROUND INFORMATION

Prior methods, control units, and internal combustion engines are known with direct gasoline injection, for example, where fuel is injected into the combustion chamber of the internal combustion engine during the intake phase in homogeneous operation or during the compression phase in stratified charge operation. Homogeneous operation is preferably provided for full-load operation of the internal combustion engine, while stratified charge operation is suitable for idling and partial load operations. Such a direct injection internal combustion engine switches between these modes of operation as a function of the required torque, for example.

In homogeneous operation, a fuel-air mixture can be supplied to the combustion chamber through a fuel tank vent. Since the air taken in through the throttle valve and the fuel mass injected directly into the combustion chamber during the intake phase are swirled homogeneously until ignition, this results in a homogeneous mixture in the combustion chamber on the whole. The lambda value of the fuel-air mixture in the combustion chamber may thus be controlled and/or regulated at a setpoint by a lambda regulation unit.

In this way, in homogeneous operation an activated carbon filter that has become loaded with fuel can be unloaded again through such a fuel tank vent. Fuel evaporating in a fuel tank can thus be utilized through the fuel tank vent. However, such unloading requires a relatively long period of time. As a result, the internal combustion engine may be operated in fuel-saving stratified charge operation only briefly.

In stratified charge operation, there is the risk that fuel-air mixture additionally drawn in through the throttle valve and the fuel tank vent might not be ignited because of its low fuel content, and thus unburned fuel would be discharged into the environment.

SUMMARY OF THE INVENTION

An object of the present invention is to provide a method of operating an internal combustion engine with which the lowest possible fuel consumption is possible while at the same time achieving the lowest possible emission of unburned fuel into the environment.

This object is achieved with a method according to the present invention by drawing a lean fuel-air mixture into the combustion chamber through the throttle valve and through the fuel tank vent in the second mode of operation, and igniting the lean fuel-air mixture by additional fuel injected and ignited in the combustion chamber. This object is achieved accordingly with a control unit and an internal combustion engine according to the present invention.

The additional fuel injected and ignited in stratified charge operation results in so-called flare ignition, in which the lean fuel-air mixture drawn in through the throttle valve and through the fuel tank vent valve is ignited.

The fuel-air mixture drawn in through the throttle valve and the fuel tank vent should be as lean as possible. It need not necessarily be ignitable by a spark. At the same time, however, the fuel-air mixture should be rich enough so that when ignited by the flare, it will burn completely. Therefore, the throttle valve and the fuel tank vent valve are adjusted accordingly.

The degree of loading of the activated carbon filter is determined by brief trial venting and through the effects thereof on the lambda value of the exhaust gas. These trial ventings should take place during homogeneous operation if possible because the lambda value of the exhaust gas can then be determined with the greatest accuracy.

With a view to the efficiency of the internal combustion engine, the lowest possible throttling is set. The fuel tank vent valve and the activated carbon filter may optionally be designed with larger dimensions than usual to allow them to deliver the required amounts of fuel. For the same reasons, venting is appropriate only beyond a certain filling level of the activated carbon filter.

Thus, on the whole this method makes it possible to use fuel tank venting not only in homogeneous operation but also in stratified charge operation. Complete combustion of the air-fuel mixture supplied through the fuel tank vent is guaranteed through the additional fuel mass which is injected directly and ignited. Thus, there is no unburned fuel to pollute the environment.

At the same time, the efficiency of the internal combustion engine in stratified charge operation is improved through the air-fuel mixture supplied additionally through the fuel tank vent. Stratified charge operation may be used to produce a greater torque due to the air-fuel mixture additionally drawn in through the fuel tank vent. Thus, it is less frequently necessary to switch to homogeneous operation, which consumes more fuel.

Likewise, operation of the fuel tank vent also in stratified charge operation yields the result that the entire fuel tank venting system becomes more efficient, and more evaporated fuel can be supplied for combustion than in the past. This represents an additional saving of fuel and at the same time a reduction in pollutants produced.

It is self-evident that the use of the fuel tank vent according to the present invention in stratified charge operation can be combined with the known use of fuel tank venting in homogeneous operation.

In an advantageous embodiment of the present invention, the total fuel mass injected is composed of the mass of the fuel contained in the lean air-fuel mixture drawn in through the fuel tank vent and the mass of the additionally injected fuel.

It is especially advantageous if the mass of the additionally injected fuel is determined as a function of the total fuel mass injected and of the mass of the fuel contained in the lean air-fuel mixture drawn in through the fuel tank vent.

This guarantees that the torque generated by the internal combustion engine can be controlled and/or regulated exactly at the desired torque by the control unit. The control unit here takes into account first the torque resulting from the air-fuel mixture as well as the torque resulting from the directly injected fuel mass.

In an advantageous refinement of the present invention, no additional fuel is injected if the lean air-fuel mixture alone is ignitable. This represents homogeneous lean operation of the internal combustion engine, which is achieved only through fuel tank venting.

Although the efficiency of the internal combustion engine is not as good in this case as that in stratified charge operation, it is possible in homogeneous lean operation to regenerate the activated carbon filter without switching to lambda-equals-one operation, which is even worse from the standpoint of efficiency. This is especially advantageous if, for example, the engine is operated for a long period of time at very low loads and high outside temperatures and if the activated carbon filter threatens to overflow, because in this case in stratified charge operation without throttling no fuel tank venting is possible because of the torque produced additionally in that case.

Another possibility is to open the throttle valve and the fuel tank vent valve only partially in stratified operation with flare ignition and thus to have a transition to throttled operation.

However, both of the possibilities described here are inferior to unthrottled stratified charge operation, so they should be used only in the exceptional situation described above.

It is especially advantageous here if the fuel tank vent and/or throttle valve is throttled to influence the resulting torque. This prevents an increase in the torque generated by the internal combustion engine above the torque desired by the driver.

Another possibility of rapidly regenerating the activated carbon filter is obtained in homogeneous operation during the unloading phases of an NOx storage catalyst. During these unloading phases, operation should be at lambda equals one. The mixture can then be made richer with the help of fuel of the fuel tank venting. The air-fuel mixture produced additionally through the fuel injector may even be lean.

Implementation of the method according to the present invention in the form of a control element provided for a control unit of an internal combustion engine in a motor vehicle in particular is especially important. A program capable of running on a computer, in particular a microprocessor, and suitable for execution of the method according to the present invention is stored in the control element. Thus, in this case the present invention is implemented by a program stored in the control element, so that this control element provided with the program represents the present invention in the same manner as the method for whose execution the program is suitable. In particular, an electric storage medium may be used as the control unit, e.g., a read-only memory or a flash memory.

Additional features, possible applications and advantages of the present invention are derived from the following description of embodiments of the present invention as illustrated in the drawing. All the features presented or described here, either alone or in any desired combination, form the object of the present invention, regardless of how they are formulated or presented in the description and/or drawing.

BRIEF DESCRIPTION OF THE DRAWINGS

The FIGURE shows a schematic diagram of one embodiment of an internal combustion engine according to the present invention.

DETAILED DESCRIPTION

The FIGURE shows an internal combustion engine 1 of a motor vehicle, a piston 2 being movable back and forth in a cylinder 3. Cylinder 3 is equipped with a combustion chamber 4, which is delimited by piston 2, at least one intake valve 5 and at least one exhaust valve 6. An intake manifold 7 is connected to intake valve 5 and an exhaust gas pipe 8 is connected to exhaust valve 6.

A fuel injector 9 and a spark plug 10 protrude into combustion chamber 4 in the area of intake valve 5 and exhaust valve 6. Fuel may be injected through fuel injector 9 into combustion chamber 4. Fuel in combustion chamber 4 may be ignited with spark plug 10.

A rotating throttle valve 11 through which air can be supplied to intake manifold 7 is accommodated in intake manifold 7. The amount of air supplied depends on the angular position of throttle valve 11. A catalyst 12 which cleans the exhaust gases formed by combustion of fuel is accommodated in exhaust pipe 8.

A back-and-forth movement is induced in piston 2 by combustion of the fuel in combustion chamber 4, this movement being transferred to a crankshaft (not shown) and transferring a torque to it.

An exhaust gas recirculation pipe 13 connects exhaust gas pipe 8 and intake manifold 7. An exhaust gas recirculation valve 14 is accommodated in exhaust gas recirculation pipe 13. In this way, exhaust gas recirculation is implemented on the whole. The exhaust gas recirculation may but need not necessarily be provided.

An activated carbon filter 15 is connected to intake manifold 7 through a fuel tank vent pipe 16. A fuel tank vent valve 17 is accommodated in fuel tank vent pipe 16. Activated carbon filter 15 is provided for a fuel tank. Fuel evaporating from the fuel tank is picked up by activated carbon filter 15 and stored there temporarily. When fuel tank vent valve 17 is opened, the temporarily stored fuel can be drawn into intake manifold 7 through fuel tank vent pipe 16. This yields a fuel tank venting on the whole.

A control unit 18 receives input signals 19, which are performance quantities of internal combustion engine 1 measured by sensors. For example, control unit 18 is connected to an air mass sensor, a lambda sensor, a rotational speed sensor or the like. In addition, control unit 18 is connected to an accelerator pedal sensor which generates a signal which indicates the position of a driver-operated accelerator pedal and thus indicates the desired torque. Control unit 18 generates output signals 20 with which the performance of internal combustion engine 1 can be influenced through actuators or controllers. For example, control unit 18 is connected to injector 9, spark plug 10, throttle valve 11 and fuel tank vent valve 17 or the like and generates the signals required for controlling them.

Control unit 18 is provided for controlling and/or regulating the performance quantities of internal combustion engine 1, among other things. For example, the fuel mass injected by injector 9 into combustion chamber 4 is controlled and/or regulated by control unit 18, in particular with a view to a low fuel consumption and/or low emission of pollutants. To this end, control unit 18 is equipped with a microprocessor which has a program suitable for performing the aforementioned control and/or regulation stored in a storage medium, a flash memory in particular.

In a first mode of operation, which is referred to as homogeneous operation, of internal combustion engine 1, throttle valve 11 is partially opened or closed as a function of the desired torque. Fuel is injected into combustion chamber 4 by injector 5 during an intake phase produced by piston 2. Turbulence is created in the fuel thus injected by the air drawn in at the same time through throttle valve 11, and thus the fuel is distributed essentially uniformly in combustion chamber 4. The fuel-air mixture is compressed during the. compression phase and then ignited by spark plug 10. Piston 2 is driven by the expansion of the ignited fuel. The resulting torque in homogeneous operation depends on the position of throttle valve II, among other things. With a view to low emission of pollutants, the fuel-air mixture is set at lambda equals one as nearly as possible.

In this first mode of operation, it is possible to open fuel tank vent valve 17 and thus draw an air-fuel mixture into combustion chamber 4 from activated carbon filter 15 in addition to the fuel mass injected directly. The fuel mass contained in the intake air-fuel mixture can be determined by control unit 18 on the basis of changes in the lambda value detected by the lambda sensor and can thus taken into account in determining the fuel mass injected directly.

In a second mode of operation, which is referred to as stratified charge operation of internal combustion engine 1, throttle valve 11 is opened widely. Fuel is injected by fuel injector 9 into combustion chamber 4 during a compression phase produced by piston 2, namely by being injected locally into the immediate environment of spark plug 10 and chronologically at a suitable interval before the ignition time. Then with the help of spark plug 10, fuel is ignited so that piston 2 is driven in the next working phase by the expansion of the ignited fuel. The resulting torque in stratified charge operation depends largely on the fuel mass injected. Stratified charge operation is provided essentially for idling and partial load operations of internal combustion engine 1.

Preferably in the first mode of operation but optionally also in the second mode of operation, the loading condition of activated carbon filter 15 is checked repeatedly. To do so, fuel tank vent valve 17 is opened briefly and the resulting change in lambda value is detected by the lambda sensor. From this, control unit 18 is able to determine the fuel mass which can be drawn in from activated carbon filter 15 as an air-fuel mixture.

If activated carbon filter 15 exceeds a predefinable loading condition, then fuel tank vent valve 17 is opened. At the same time, throttle valve is controlled so that a lean air-fuel mixture is drawn into combustion chamber 4 on the whole through fuel tank vent valve 17 and throttle valve 11. This lean air-fuel mixture is distributed largely uniformly in combustion chamber 4 and is thus homogeneous. The air-fuel mixture then present in combustion chamber 4 may be so lean that it cannot be ignited by a spark as is.

Then an additional fuel mass is injected directly into combustion chamber 4 by fuel injector 9. This fuel mass is kept as small as possible. It depends on the fuel mass present in the air-fuel mixture drawn in through fuel tank vent valve 17 and it depends on the total fuel mass to be injected or supplied as determined by control unit 18 and as required to produce the desired torque.

The additional fuel mass injected directly through fuel injector 9 is ignited by spark plug 10, resulting in flare ignition. Through this flare ignition, the lean air-fuel mixture drawn into combustion chamber 4 from activated carbon filter 15 is also ignited.

The torque generated by internal combustion engine 1 is thus composed of the torque resulting from the lean air-fuel mixture drawn in from activated carbon filter 15 and the torque resulting from the fuel mass additionally injected directly into combustion chamber 4. The mode of operation of internal combustion engine 1 described here can thus be used only when internal combustion engine 1 requires a greater torque than that resulting from the lean air-fuel mixture.

The modes of operation of internal combustion engine 1 described below are less advantageous than the mode of operation described above from the standpoint of efficiency. Therefore, the following modes of operation are provided only when the mode of operation described above cannot be implemented because of a very low load on internal combustion engine 1 and because activated carbon filter 15 is fully loaded.

For example, if internal combustion engine 1 has been operated at a very low load for a very long period of time, and if activated carbon filter 15 threatens to overflow after a prolonged time at high temperatures, for example, then it is possible through an appropriate setting of fuel tank vent valve 17 to provide a homogeneous lean air-fuel mixture in combustion chamber 4 only with the help of the fuel tank vent and the air through throttle valve 11. Then this lean air-fuel mixture drawn into combustion chamber 4 from activated carbon filter 15 may optionally be ignited without any additional directly injected fuel mass. In this case, no fuel mass is injected additionally and the air-fuel mixture is ignited directly by spark plug 10. This is homogeneous lean operation of internal combustion engine 1, which is implemented through fuel tank venting alone.

If, with the modes of operation of internal combustion engine 1 described above, the torque produced is greater than that required, then the torque produced can be reduced to the desired level through appropriate throttling of fuel tank vent valve 17 and/or throttle valve 11. This represents throttled stratified charge operation with flare ignition. Development of an unwanted excessive torque can thus be reliably prevented.

Use of fuel tank venting in stratified charge operation as described above may be combined with the use of fuel tank venting in homogeneous operation as also described above.

Another use of fuel tank venting is possible in homogeneous operation during the unloading phases of an NOx storage catalyst. In this case during homogeneous operation, the air-fuel mixture can be made richer through the additional fuel tank venting, thus supporting this unloading of the NOx storage catalyst.

What is claimed is:

1. A method of operating an internal combustion engine, comprising the steps of:

drawing air into a combustion chamber through a throttling device that includes a throttle valve;

causing a fuel injector to directly inject a fuel into the combustion chamber during one of an intake phase in a first mode of operation and a compression phase in a second mode of operation;

in the first mode of operation, drawing an air-fuel mixture into the combustion chamber through a fuel tank vent;

in the second mode of operation, drawing a lean air-fuel mixture into the combustion chamber through the throttle valve and through the fuel tank vent;

injecting an additional mass of the fuel, the additional mass of the fuel being determined as a function of a total fuel mass to be injected and a mass of the fuel contained in the lean air-fuel mixture drawn in through the throttle valve and through the fuel tank vent, a mass of the fuel drawable from the fuel tank vent being determined in advance; and igniting the lean air-fuel mixture by using the additional mass of the fuel that is injected into and ignited in the combustion chamber.

2. The method according to claim 1, wherein:

the internal combustion engine is of a motor vehicle.

3. The method according to claim 1, wherein:

the total fuel mass to be injected includes the mass of the fuel contained in the lean air-fuel mixture drawn in through the throttle valve and through the fuel tank vent and the additional mass of the fuel.

4. The method according to claim 1, wherein:

no additional fuel is injected if the lean air-fuel mixture alone is ignitable.

5. The method according to claim 1, further comprising the step of:

throttling at least one of the fuel tank vent and the throttle valve to influence a resulting torque.

6. A control element for storing a program that when executed on a computer results in a performance of the steps of:

drawing air into a combustion chamber through a throttling device that includes a throttle valve;

causing a fuel injector to directly inject a fuel into the combustion chamber during one of an intake phase in a first mode of operation and a compression phase in a second mode of operation;

in the first mode of operation, drawing an air-fuel mixture into the combustion chamber through a fuel tank vent;

in the second mode of operation, drawing a lean air-fuel mixture into the combustion chamber through the throttle valve and through the fuel tank vent;

injecting an additional mass of the fuel, the additional mass of the fuel being determined as a function of a total fuel mass to be injected and a mass of the fuel contained in the lean air-fuel mixture drawn in through the throttle valve and through the fuel tank vent, a mass of the fuel drawable from the fuel tank vent being determined in advance; and igniting the lean air-fuel mixture by using the additional mass of the fuel that is injected into and ignited in the combustion chamber.

7. The control element according to claim 6, wherein:

the control element includes a flash memory for a control unit of an internal combustion engine.

8. The control element according to claim 7, wherein:

the internal combustion engine is of a motor vehicle.

9. A control unit for an internal combustion engine, the control unit when activated results in a performance of the steps of:

drawing air into a combustion chamber through a throttling device that includes a throttle valve;

causing a fuel injector to directly inject a fuel into the combustion chamber during one of an intake phase in a first mode of operation and a compression phase in a second mode of operation;

in the first mode of operation, drawing an air-fuel mixture into the combustion chamber through a fuel tank vent;

in the second mode of operation, drawing a lean air-fuel mixture into the combustion chamber through the throttle valve and through the fuel tank vent;

injecting an additional mass of the fuel, the additional mass of the fuel being determined as a function of a total fuel mass to be injected and a mass of the fuel contained in the lean air-fuel mixture drawn in through the throttle valve and through the fuel tank vent, a mass of the fuel drawable from the fuel tank vent being determined in advance; and igniting the lean air-fuel mixture by using the additional mass of the fuel that is injected into and ignited in the combustion chamber.

10. The control unit according to claim 9, wherein:

the internal combustion engine is in a motor vehicle.

11. An internal combustion engine, comprising:

a combustion chamber into which air is drawable through a throttle valve, into which a fuel is directly injectable by a fuel injector during one of an intake phase in a first mode of operation and a compression phase in a second mode of operation and is ignitable by a spark plug, and into which an air-fuel mixture is drawable through a fuel tank vent; and a control unit that when activated results in a performance of:

in the second mode of operation, drawing a lean air-fuel mixture into the combustion chamber through the throttle valve and through the fuel tank vent, injecting an additional mass of the fuel, the additional mass of the fuel being determined as a function of a total fuel mass to be injected and a mass of the fuel contained in the lean air-fuel mixture drawn in through the throttle valve and through the fuel tank vent, a mass of the fuel drawable from the fuel tank vent being determined in advance, and igniting the lean air-fuel mixture by using the additional mass of the fuel that is injected into and ignited in the combustion chamber.

12. The internal combustion engine according to claim 11 wherein:

the internal combustion engine is for a motor vehicle.

* * * * *

UNITED STATES PATENT AND TRADEMARK OFFICE
CERTIFICATE OF CORRECTION

PATENT NO. : 6,725,836 B1
DATED : April 27, 2004
INVENTOR(S) : Wolfgang Boerkel

It is certified that error appears in the above-identified patent and that said Letters Patent is hereby corrected as shown below:

Title page,
Item [57], ABSTRACT,
Line 14, change "into combustion chamber" to -- into the combustion chamber --.

Column 5,
Line 47, change "throttle valve is controlled" to -- throttle valve 11 is controlled --.

Signed and Sealed this

Thirteenth Day of September, 2005

JON W. DUDAS
*Director of the United States Patent and Trademark Office*